March 18, 1924.  
H. CLAUSING  
GAS VALVE  
Filed March 8, 1922  
1,487,207  
3 Sheets-Sheet 3

Inventor  
Heinrich Clausing  
by  
Attorney.

Patented Mar. 18, 1924.

1,487,207

UNITED STATES PATENT OFFICE.

HEINRICH CLAUSING, OF BOCHUM, GERMANY.

GAS VALVE.

Application filed March 8, 1922. Serial No. 542,125.

*To all whom it may concern:*

Be it known that I, HEINRICH CLAUSING, a citizen of Germany, residing at Bochum, Germany, have invented certain new and useful Improvements in Gas Valves, of which the following is a specification.

My invention relates to valves for use in connection with gas pipe of large diameter, such as used in gas and coke ovens, and more particularly for pipes serving as passage for hot gases or gases containing impurities such as tar. The novel valve is designed in the first place for connecting the delivery pipes of retort ovens for the production of gas and coke (coke ovens) with the collecting tubes. It is applicable with particular advantage to double collecting tubes such as used in the fractional distillation for separating the rich from the poor gas. It may also be used with advantage for connecting a further collector for the so-called wild or charging gases which are formed when the oven is charged.

In the drawings affixed to this specification and forming part thereof a device embodying my invention is illustrated diagrammatically by way of example.

In the drawings

Figure 1:
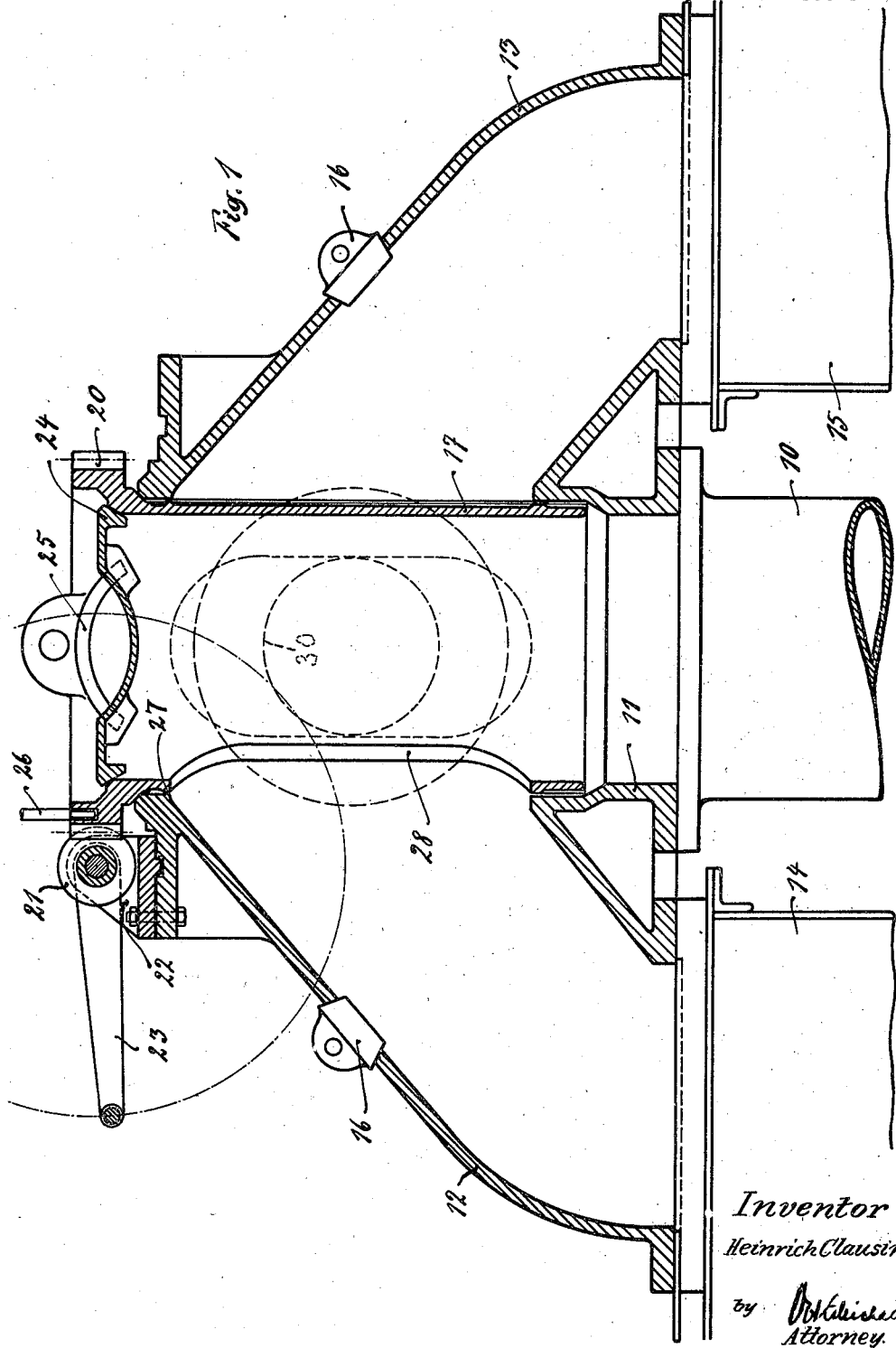
Fig. 1 is a sectional elevation.
Figure 2:
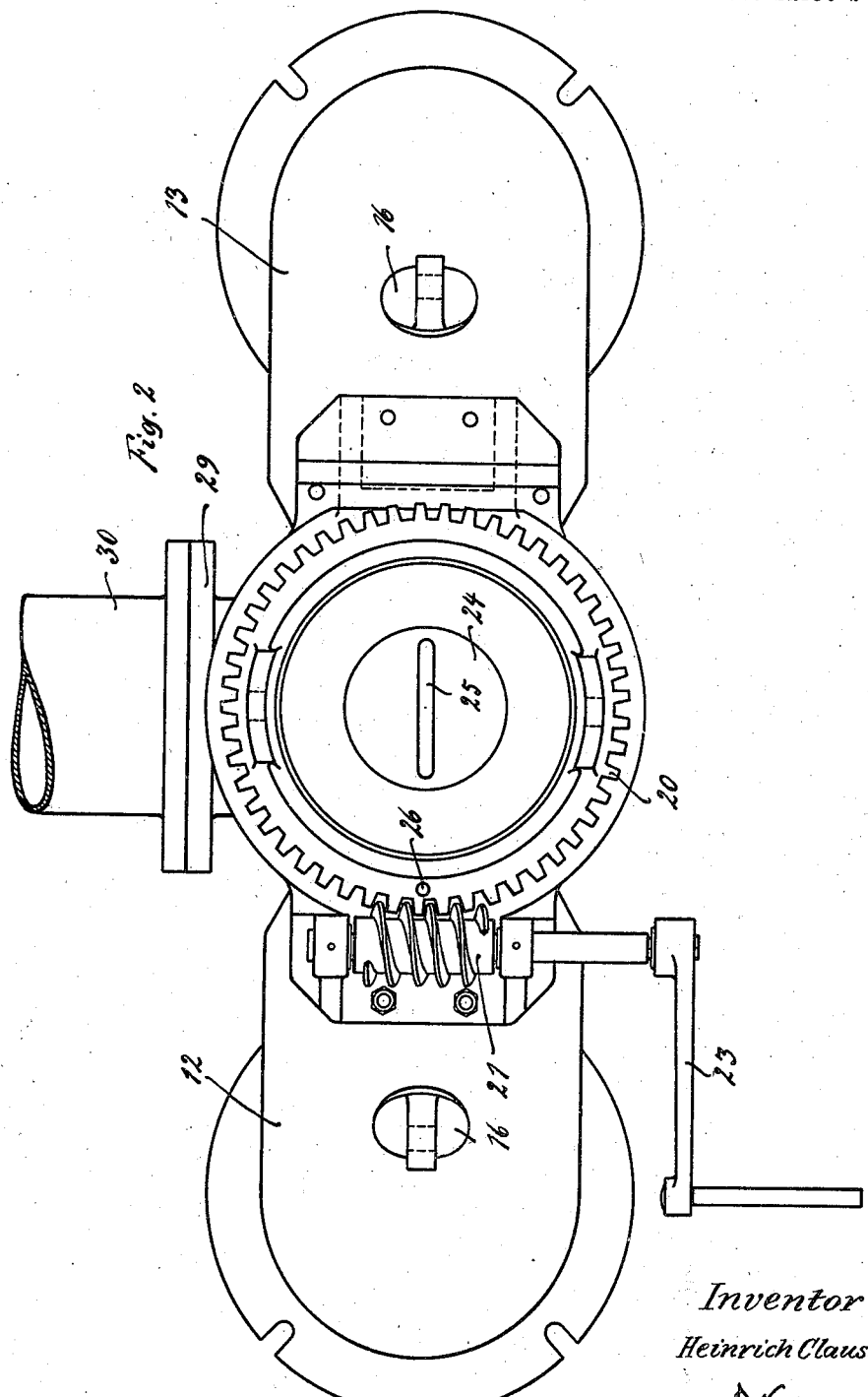
Fig. 2 is a plan view.
Figure 3:
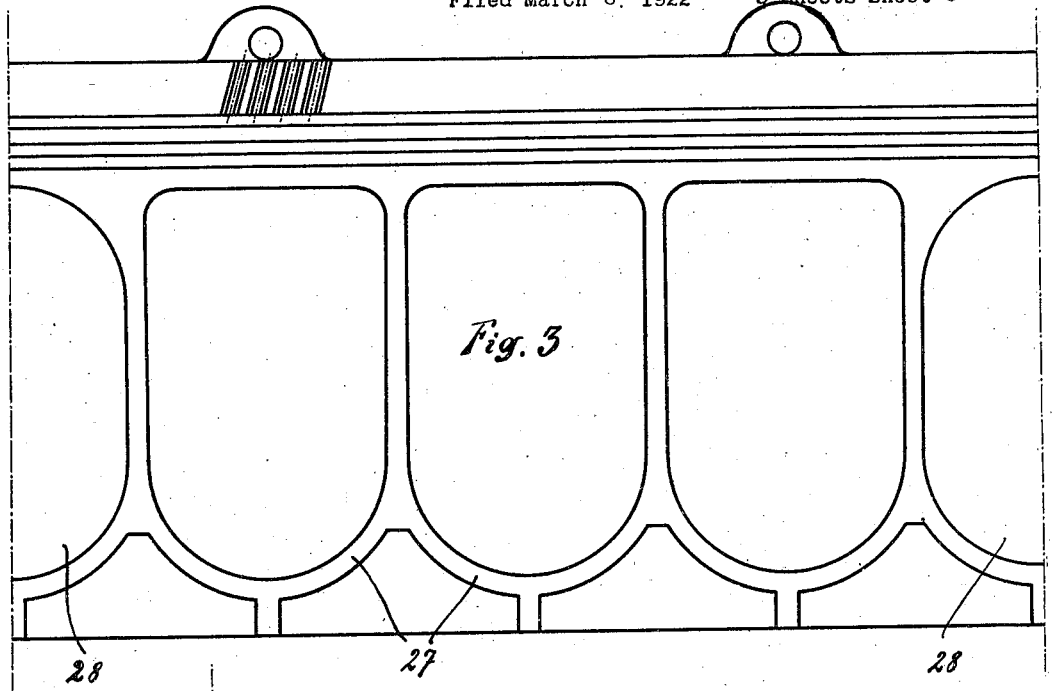
Fig. 3 is a development of the valve cylinder.
Figure 4:
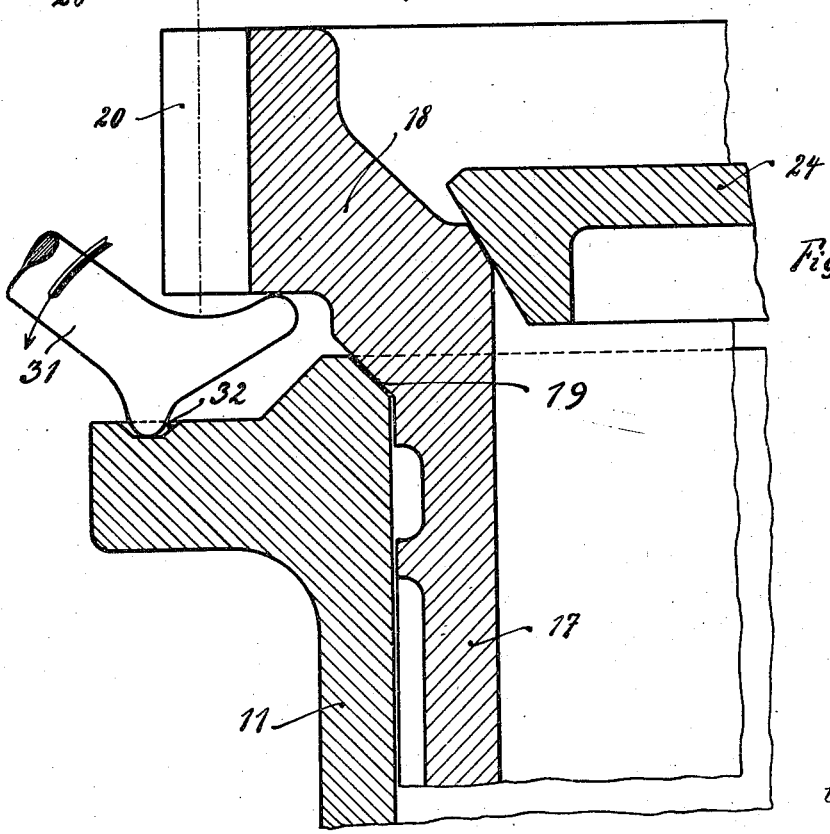
Fig. 4 is a vertical section showing a detail drawn to a larger scale.

Referring to the drawings, 11 is a casing comprising a central pipe 11 and two branch pipes 12 and 13, said casing being secured to a delivery pipe 10 which may be connected with the suction opening of a coke oven or the like. The branch pipes 12, 13 are connected with collectors 14, 15. One of which is supplied with the rich gas of the first the other with the poor gas from the last distillation stages. Plugs 16 permit access to the branches 12, 13. In a bore of the casing is inserted a cylindrical valve 17 whose projecting neck 18 is ground to a corresponding seat 19 in the casing where the valve is held tight by its own weight. The seat is preferably conical. A toothed rim 20 formed in the neck 18 is adapted to mesh with a worm gear 21 which is supported in a bracket 22 and provided with a crank 23. The cylinder 17 is closed at the top by a cover 24 having a conical seat and being provided with a handle 25. A vertical rod 26 is secured to the neck 18. The valve 17 is provided on its outer surface with projecting ribs 27 which also surround its opening 28. A third pipe connection 29 is provided on the casing 11 at right angles to the pipes 12, 13; and the pipe 30 for the wild gas is connected therewith.

The hot gases from the delivery pipe 10 enter the valve 17 and pass on to the pipe 12 through the opening 28 in the valve and further to the collector 14. By means of the crank 23, and the worm 21 the valve 17 may be turned so as to connect the opening 28 with the pipe 13 and the collector 15. In the intermediate positions, when the opening 28 faces the solid portion of the casing, the pipes 12, 13 are closed, while, when the valve 17 is rotated further, the pipe 10 is connected with the pipe 29. By means of the rod 26 the position of the valve 17 can be observed from below so that the operator is in a position to ascertain whether the valves of a battery of coke ovens are in the correct positions.

The arrangement of a hollow cylindrical valve for controlling the flow of the gases in the manner described has the advantage that a valve is provided which is particularly adapted to withstand heat. The upper portion of the valve is readily accessible so that any matter sticking to it, such as tar, can be removed during operation. The lower end of the valve 17 being open and the hot gases entering it, the valve is not exposed to any one-sided heat action. Moreover as the valve is designed with full consideration of the heat to which it is exposed in operation, any deformation is avoided. When the valve is arranged in a vertical position and co-axially with the pipe 10, the further advantage is obtained that any deposits which may adhere to it, can fall back into the delivery pipe. Owing to the cover 24 this pipe is readily accessible notwithstanding the presence of the valve 17.

In the example shown in Fig. 1, the delivery pipes as well as the collecting pipes 14, 15 are readily accessible. In the vertical position of the valve 17 it is kept tight on the seat 19 by its own weight.

The projecting ribs 27 on the outer surface of the valve 17 are so arranged as to surround the openings of the pipes 12, 13 and 29. This construction avoids having the entire surface of the valve 17 in contact with the inner surface of the casing 11. If the entire surface of the valve were in contact with the casing and deposits were to form between the cylinder and the casing, the cylinder would be liable to stick. The projections 27, however, not only reduce the contact surface to a minimum but also owing to their sharp edges act as scrapers and remove deposits in the casing 11.

The toothed rim 20 is so designed that the valve 17 can be removed and exchanged without being forced to dislocate the worm 21. This has the further advantage that the valve 17 may be lifted during operation in case it should stick. This may be effected by means of a crow bar 31 which, in order to prevent slipping, is inserted with its heel in a groove 32 in the flange of the casing 11 while its end engages the neck 18 from below.

When the valve 17 and the delivery pipe 10 are of equal width, they may be cleaned simultaneously by means of a rod having secured to it a disc of somewhat smaller diameter than the width of the valve and pipe.

I wish to be understood that I do not desire to be limited to the exact details of construction shown and described, for obvious modifications will occur to a person skilled in the art.

I claim:

1. A gas valve for gas and coke ovens comprising in combination, a substantially cylindrical valve casing and a hollow cylindrical plug open at the bottom extending from above into said casing in contact with the casing wall, a flange formed around the upper end of said plug being pressed against the upper edge of said valve casing solely by the weight of said plug.

2. A gas valve for gas and coke ovens comprising in combination, a substantially cylindrical valve casing and a hollow cylindrical plug open at the top and bottom extending from above into said casing in contact with the casing wall and a removable cover on the upper end of said plug, a flange formed around the upper end of said plug, being pressed against the upper edge of said valve casing solely by the weight of said plug.

3. A gas valve for gas and coke ovens comprising in combination, a valve casing, an empty hollow plug seated therein with a clearance and projecting ribs on said plug bridging the clearance and adapted to remove particles adhering to the inner wall of said casing.

In testimony whereof I affix my signature.

HEINRICH CLAUSING.

Witnesses:
WILLIAM E. LANE,
E. MACDUFF FYFE.